United States Patent [19]

Levin

[11] 4,023,636

[45] May 17, 1977

[54] SINGLE LEVER CONTROL UNIT FOR HYDROSTATIC TRANSMISSION

[75] Inventor: Daniel R. Levin, Coralville,, Iowa

[73] Assignee: J. I. Case Company, Racine, Wis.

[22] Filed: Oct. 1, 1975

[21] Appl. No.: 618,445

[52] U.S. Cl. .......................... 180/6.48; 74/471 XY; 188/18 A; 188/163; 180/77 H

[51] Int. Cl.² ......................................... B62D 11/02

[58] Field of Search ....................... 180/77 H, 6.48; 74/471 XY; 188/18 A, 163

[56] References Cited

UNITED STATES PATENTS

| | | | |
|---|---|---|---|
| 3,322,240 | 5/1967 | Dotto | 188/163 |
| 3,431,993 | 3/1969 | Case | 180/6.48 |
| 3,541,877 | 11/1970 | Houk | 180/77 H |
| 3,613,817 | 10/1971 | Glass | 180/6.48 |
| 3,757,597 | 9/1973 | Vogel | 74/471 XY |
| 3,792,744 | 2/1974 | Gray | 180/6.48 |
| 3,831,633 | 8/1974 | Comer | 74/471 XY X |
| 3,880,251 | 4/1975 | Clevanger | 180/77 H |

Primary Examiner—Joseph F. Peters, Jr.
Assistant Examiner—John P. Silverstrim
Attorney, Agent, or Firm—Dressler, Goldsmith, Clement, Gordon & Shore, Ltd.

[57] ABSTRACT

A single lever control unit for operating a vehicle that is driven by first and second variable displacement, reversible hydraulic motors is disclosed herein. The single handle control lever is capable of simultaneously moving a pair of control arms the same amount in either direction to control the forward and reverse speed of movement of the vehicle and also to vary the amount of movement of the control arms by moving the lever about a second pivot axis to control the direction of movement of the vehicle. The control unit also incorporates a releasable lock member that is capable of holding the control arms in an adjusted position so that the vehicle may be driven at a given forward or reverse speed without any forces being applied to the control lever.

3 Claims, 4 Drawing Figures

SINGLE LEVER CONTROL UNIT FOR HYDROSTATIC TRANSMISSION

BACKGROUND OF THE INVENTION

Vehicles, such as crawler tractors, are conventionally driven by a pair of drive units that respectively cooperate with the two tracks on opposite sides of the vehicle. For years, it has been customary to have two separate control levers respectively controlling the speed and direction of the two drive units on opposite sides of the vehicle.

More recently, various types of single handle control levers have been developed for simultaneously controlling the speed and direction of movement of the respective drive units by proper manipulation of the single handle control lever. Examples of such units are disclosed in Case, U.S. Pat. No. 3,431,993, and Gray, U.S. Pat. No. 3,792,744.

The above Gray patent discloses a single handle control system for a pair of hydraulically operated motors that drive two pairs of wheels respectively located on opposite sides of a vehicle. The single control lever is connected to control arms forming part of respective motors through rigid links so that movement of the control lever about one axis extending transversely of the vehicle will simultaneously move both control arms the same amount in the same direction while movement of the control lever about a second perpendicular axis entending longitudinally of the vehicle will move the respective control arms in opposite directions. Thus, the vehicle speed in the forward or reverse direction is controlled by moving the handle about the first pivot axis and the steering of the vehicle is controlled by moving the handle about the second pivot axis.

One of the problems encountered with a control unit of this type is that the operator must at all times maintain pressure on the control handle to keep the vehicle moving in a given direction at a given speed. This becomes extremely annoying, particularly when the vehicle is being transported between job sites.

SUMMARY OF THE INVENTION

According to the present invention, a single handle control lever for controlling the speed and direction of movement of a vehicle incorporates releasable lock means that allows the operator to lock the control unit in a given position so that the vehicle will be travelling in the forward or reverse direction at a given speed. The releasable latch means gives the operator the freedom of turning the vehicle while it is in a locked condition so that the unit can readily be locked in a position or a predetermined forward speed for transportation from one job site to another while still allowing some maneuverability or change in direction of the vehicle while the unit is in the locked condition.

More specifically, the vehicle to which this invention is directed includes two variable displacement, reversible hydraulic means for driving first and second members on opposite sides of the vehicle with each hydraulic means having a pivoted control arm. The movement of the control arms is controlled by a single control lever that is pivoted about two perpendicular axes and has one end connected to both control arms through a bar and rigid links.

The control lever is arranged so that pivotal movement of the lever about an axis entending transversely of the vehicle will move both control arms the same amount in a given direction to control the forward and reverse speed of the vehicle. Pivotal movement of the control lever about the second pivot axis will move the control arms in opposite directions to control the turning movement of the vehicle.

According to the present invention, the single lever control unit also incorporates releasable latch means that cooperate with the control lever to hold the control lever in any one of an infinite number of fixed positions with respect to the first pivot axis while accommodating movement of the lever about the second pivot axis. This means that the speed of the vehicle can be set by the releasable latch means while turning movements can readily be made by manipulation of the control lever.

In the specific embodiment illustrated, the releasable latch means consists of a plate that is connected to a block which supports the control lever and pivots with the lever about the first pivot axis. The releasable latch means also includes a friction pad that is engageable with the plate to hold the plate, block and lever in an adjusted position with respect to the first pivot axis. The movement of the friction pad is preferably accomplished by electrically operated solenoid means that, when energized, will move the friction pad to an engaged position with respect to the plate.

DETAILED DESCRIPTION

Figure 1:
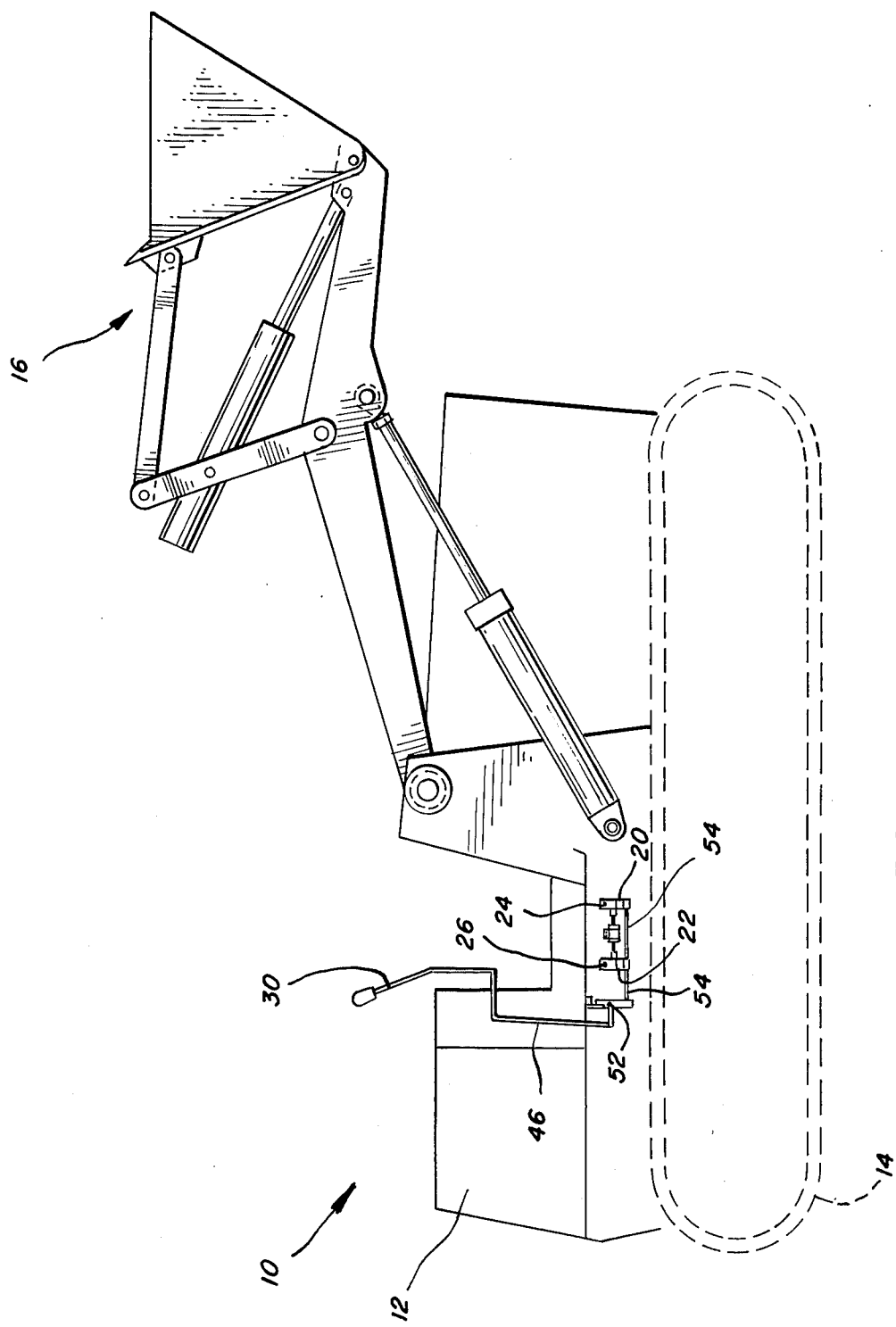
FIG. 1 is an overall view of the vehicle with the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings indicates a vehicle 10, such as a crawler tractor, which may be controlled by the control unit of the present invention. Crawler tractor 10 includes a body 12 supported by a pair of endless tracks 14 (only one being schematically illustrated in FIG. 1) on opposite sides of the body. Vehicle 10, more particularly body 12, supports a front end loader generally indicated at 16. Since the loader or bucket forms no part of the present invention, no detailed description thereof appears to be necessary.

The respective endless tracks 14 are respectively driven by first and second variable displacement, reversible hydraulic means (not shown) that are connected to the first and second driven members, such as drive sprockets cooperating with the respective endless tracks. Each of the hydraulic drive means may include a fixed displacement pump (not shown) the output of which is connected to a variable displacement motor connected directly to the drive sprocket for each of the two endless tracks. The respective variable displacement motors have control arms 20 and 22 that are respectively pivoted about fixed pivot axes 24 and 26 which extend generally transversely of the longitudinal axis of the vehicle. The respective control arms 20 and 22 are moved in opposite directions from a neutral position (indicated in FIG. 1) by a single control lever 30 supported in a manner that will be described later.

Figure 2:
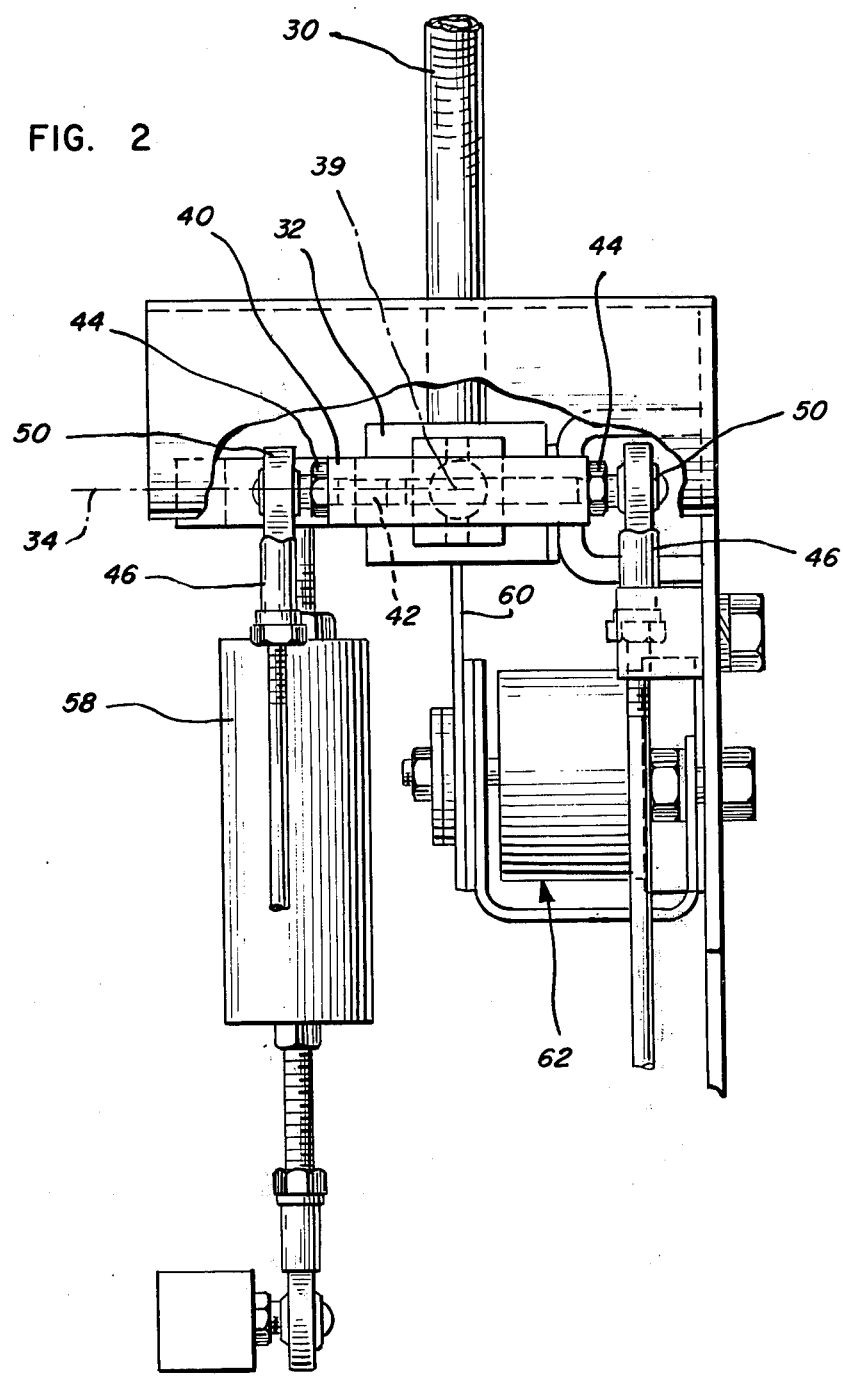
FIG. 2 is an enlarged view of a portion of the control lever unit.
Figure 3:
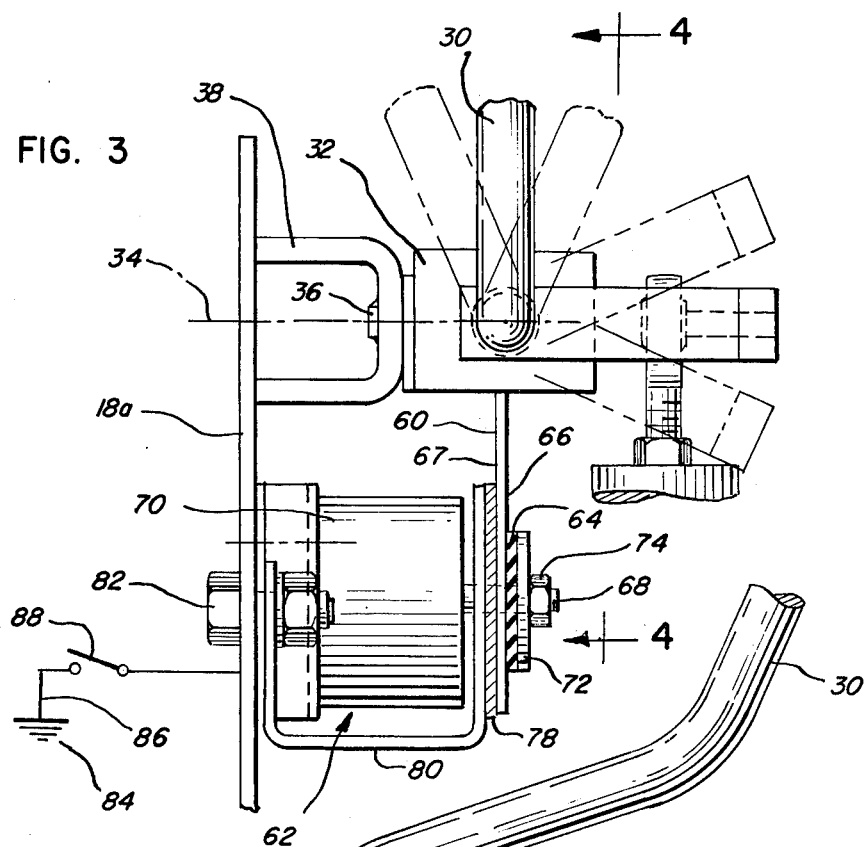
FIG. 3 is a fragmentary sectional view, with portions deleted, showing the releasable latch means cooperating with the lever.
Figure 4:
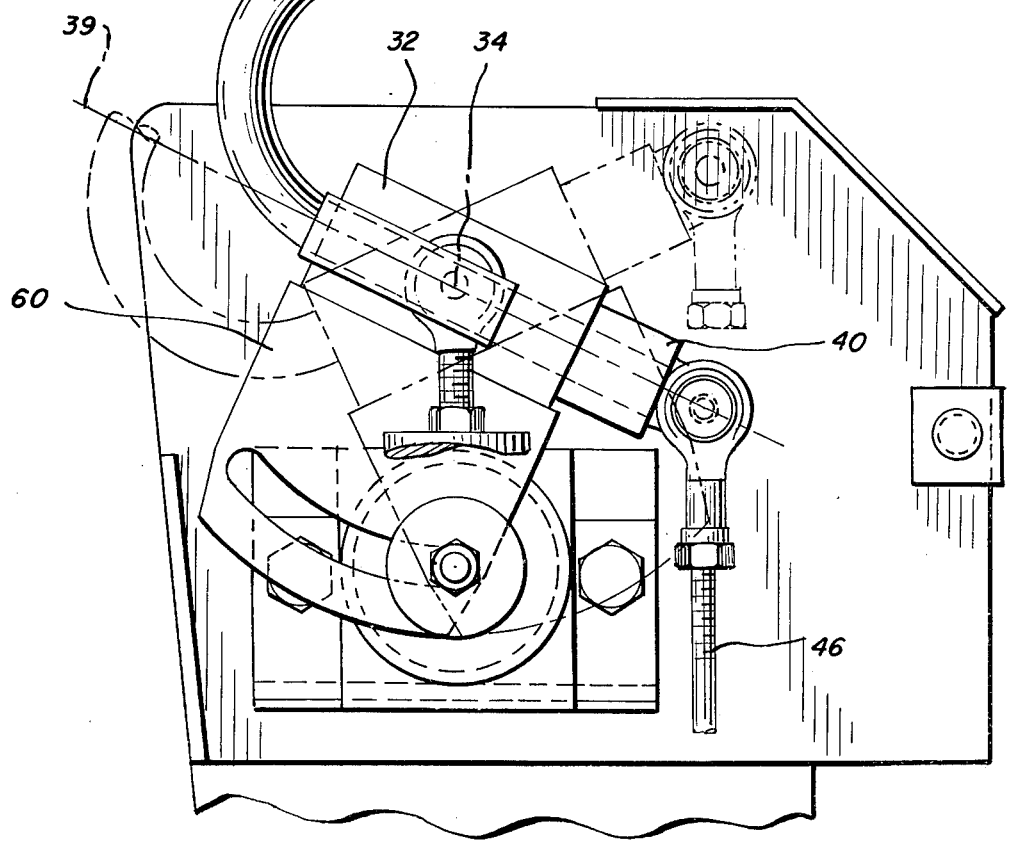
FIG. 4 is an elevation view, as viewed along line 4—4 of FIG. 3.

As illustrated in FIGS. 2, 3 and 4, control lever 30 is supported for rotation about a fixed longitudinal axis by a block 32. Block 32 (FIG. 3) is supported for rotation about a fixed pivot axis 34 defined by a bolt 36 that is supported on a bracket 38 fixed to a body portion 18a. Thus, single handle control lever 30 and block 32 are capable of being pivoted about the first pivot axis 34 which extends transversely of the vehicle and parallel to pivot axes 24 and 26. Also, single handle control lever can be pivoted with respect to block 32 about a second pivot axis 39 which extends perpendicularly to the first pivot axis and generally longitudinally of vehicle 10.

Control handle 30 is connected to the respective control arms 20 and 22 through a rigid linkage system illustrated in FIGS. 1 and 2 of the drawings. As shown in FIG. 2, the lower free end of control lever 30 has a bar 40 secured thereto and bar 40 extends parallel to the first pivot axis 34 for control lever 30 and is spaced from pivot axis 34, as illustrated in FIG. 4. Bar 40 has a threaded screw 42 extending therethrough and held in an adjusted position with respect to the bar by a pair of lock nuts 44. The opposite ends of threaded screw 42 have a pair of rigid links 46 supported thereon by universal connections 50. The lower end of links 46 are respectively connected to first legs of a pair of bell cranks 52 which are supported about pivot axes that extend parallel to the axes 24 and 26. The second legs of the respective bell cranks 52 are respectively connected to control arms 20 and 22 through rigid links 54.

Thus, pivotal movement of single handle control lever 30 about pivot axis 34, which extends transversely of the vehicle, will simultaneously move both control arms 20 and 22 in the same direction the same amount. For example, movement of the control lever 30 to the phantom line position illustrated in FIG. 4 will move both control arms 20 and 22 a predetermined amount and will control the speed of the vehicle in a forward direction while movement of the control lever to the solid-line position shown in FIG. 4 will move both control arms from a neutral central position to control the speed of the vehicle in the reverse direction. Also, pivotal movement of the control lever about the pivot axis 39 within block 32 will move the respective control arms 20 and 22 an equal amount in opposite directions to control the direction or turning movement of the vehicle. Preferably, control lever 30 is biased to a neutral position with respect to the second pivot axis 39 by a spring biasing mechanism 58 so that release of the control lever 30 will automatically cause the control lever to assume the neutral position illustrated in FIG. 2 of the drawings.

According to the present invention, the control mechanism also includes releasable means cooperating with control lever 30 for holding the lever 30 in an adjusted position with respect to pivot axis 34 so that the vehicle can be locked into a fixed position of movement in the forward direction while still accommodating movement of the lever about the second pivot axis 39 to turn the vehicle. This is highly desirable in instances where the vehicle is being transported a substantial distance, such as between work sites. This allows the operator to release the control lever and still have the vehicle travelling in a given direction, particularly the straight-ahead forward direction.

As illustrated in FIGS. 3 and 4, control block 32 has a plate 60 secured thereto for movement therewith about pivot axis 34. As shown in FIG. 3, plate 60 is secured to block 32 and is located in a plane that passes through the pivot axis 39. A releasable latch means 62 cooperates with plate 60 for holding plate 60, block 32 and lever 30 in an adjusted position with respect to the pivot axis 34 while still accommodating movement of the lever about the second pivot axis 39. The releasable latch means 62 is illustrated as including a friction pad 64 adapted to engage a surface 66 of plate 60.

A backing plate or member 78 is secured to bracket 80 and is positioned adjacent surface 67 of plate 60 so that plate 60 may be clamped between plate 78 and friction pad 64, as will be described later.

Friction pad 64 which may be formed of a resilient material, such as rubber or the like, is supported on the outer end of an armature or plunger 68 of a solenoid 70 through a washer 72 and a lock nut 74. Solenoid 70 is fixedly secured to body portion 18a through bracket 80 and a bolt 82. Solenoid 70 is energized from a battery or other electrical source 84 which forms part of vehicle 10. Preferably, battery 84 is connected to solenoid 70 through a lead 86 which has a normally open switch 88 therein. Normally open switch 88 is preferably a foot pedal type switch located in the operator's compartment of the vehicle, for a purpose that will be described later.

As will be appreciated from the above description, if the vehicle is to be driven in a straight-ahead direction for a substantial distance, the operator can select the speed of the vehicle by manipulating control lever 30 about pivot axis 34 to set the desired speed for the vehicle. The operator can then close switch 88 with his foot which will energize solenoid 70 and move friction pad 64 from a disengaged first position to an engaged second position to clamp plate 60 between backing plate 78 and pad 64. This will lock control lever 30 and block 32 in an adjusted position with respect to pivot axis 34 so that the vehicle will be moving at a given speed. This allows the operator to release the control handle 30 and the vehicle will still be operating at the forward speed.

Because of the positioning of plate 60 with respect to pivot axis 39, the plate and block can be held in a fixed position with respect to pivot axis 34 while the control lever is still free to be pivoted about pivot axis 39. This feature is of importance in allowing the operator to turn the vehicle while the vehicle is locked in a given speed, particularly in the forward direction. For example, if the operator is travelling along at a given speed in a straight-ahead forward direction, and encounters an obstruction, the operator can pivot the control lever about the second pivot axis 39 and change the direction of the vehicle. After the obstruction has been passed, the operator need only release the control lever 30 and spring biasing means 58 will automatically move the lever and control arms 20 and 22 to the previously set straight-ahead forward speed.

What is claimed is:

1. In a vehicle having an elongated frame with first and second driven members on opposite sides of said frame; first and second variable displacement, reversible hydraulic means respectively connected to said driven members for driving said members at varying speeds in opposite directions, each of said hydraulic means including a pivoted control arm pivoted about a pivot axis in opposite directions from a neutral position; a single control lever for moving said control arms; mounting means mounting said control lever for pivotal movement about a first pivot axis extending parallel to the pivot axes for said control arms and a second pivot axis extending perpendicular to said first pivot axis, said mounting means including a block supporting said lever, a bar fixed to said block at a location spaced from said first pivot axis and extending parallel to said first pivot axis, and rigid link means respectively connecting opposite ends of said bar to respective control arms so that movement of said lever about said first pivot axis will move both control arms in one direction to control the forward and reverse speed of said vehicle and movement of said lever about said second pivot axis will move said control arms in opposite directions to control the direction of said vehicle, the improvement comprising a plate secured directly to said block with said plate and block being pivoted as a unit with said lever about said first pivot axis, and releasable latch means cooperating with said plate for holding said plate, block and lever in an adjusted position with respect to said first pivot axis while accommodating movement of said lever about said second pivot axis, said latch means including an electrically operated solenoid having a plunger movable between first and second positions, a friction pad secured to a free end of said plunger and movable therewith so that said pad is forced into engagement with said plate when said plunger is moved from said first to said second position.

2. A vehicle as defined in claim 1, further including a fixed backing member on a side of said plate opposite said pad so that said plate is clamped between said backing member and said pad in said engaged position.

3. A vehicle as defined in claim 1, further including biasing means cooperating with said lever for moving said lever to a neutral position with respect to said second pivot when said lever is released.

* * * * *